(12) United States Patent
Lee et al.

(10) Patent No.: US 10,494,078 B2
(45) Date of Patent: Dec. 3, 2019

(54) ILLUMINATING SIDEWALL SYSTEMS AND METHODS FOR AN INTERNAL CABIN OF A VEHICLE

(71) Applicant: THE BOEING COMPANY, Chicago, IL (US)

(72) Inventors: Sunghoon Lee, Bellevue, WA (US); Weston Van Wambeke, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/895,020

(22) Filed: Feb. 13, 2018

(65) Prior Publication Data

US 2019/0248465 A1 Aug. 15, 2019

(51) Int. Cl.
*B64C 1/14* (2006.01)
*B64D 11/00* (2006.01)

(52) U.S. Cl.
CPC ............ *B64C 1/1492* (2013.01); *B64D 11/00* (2013.01); *B64D 2011/0038* (2013.01)

(58) Field of Classification Search
CPC .............................. B64C 1/1492; B64D 11/00
See application file for complete search history.

(56) References Cited

U.S. PATENT DOCUMENTS

| 5,558,425 A * | 9/1996 | Pons ........................ B60Q 3/74 |
| | | 362/220 |
| 5,647,658 A * | 7/1997 | Ziadi ..................... B64D 11/00 |
| | | 362/471 |
| 9,527,437 B2 | 12/2016 | Valentine |
| 2005/0135093 A1* | 6/2005 | Alexanderson ....... F21V 29/004 |
| | | 362/227 |
| 2015/0029737 A1* | 1/2015 | Granzeier ............ B64C 1/1484 |
| | | 362/471 |
| 2016/0238214 A1* | 8/2016 | Hashimoto ........... B64D 11/00 |

* cited by examiner

*Primary Examiner* — Britt D Hanley
*Assistant Examiner* — Nathaniel J Lee
(74) *Attorney, Agent, or Firm* — Joseph M. Butscher; The Small Patent Law Group, LLC (57) ABSTRACT

An illuminating sidewall system for an internal cabin of a vehicle includes a sidewall panel including at least one window, and a lighting assembly mounted in relation to the sidewall panel above the window(s). The lighting assembly is configured to emit light onto the sidewall panel over the window(s).

33 Claims, 6 Drawing Sheets

ILLUMINATING SIDEWALL SYSTEMS AND METHODS FOR AN INTERNAL CABIN OF A VEHICLE

FIELD OF EMBODIMENTS OF THE DISCLOSURE

Embodiments of the present disclosure generally relate to sidewall panels within an internal cabin of a vehicle, and, more particularly, to illuminating sidewall systems.

BACKGROUND OF THE DISCLOSURE

Commercial aircraft typically include an internal cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

The internal cabin is typically defined by interior sidewalls that connect to a ceiling and a floor. The sidewalls include windows that allow passengers to see outside of the aircraft.

Certain airline providers may prefer to customize portions of the sidewalls with graphics, for example. In at least some situations, it may be desired to change such customized features during or between flights, for example.

However, various known sidewalls within aircraft are not configured to be adaptively changed. Moreover, certain passengers may find sidewalls within aircraft to be aesthetically sterile and plain.

SUMMARY OF THE DISCLOSURE

A need exists for a system and method of adaptively modifying sidewalls within an internal cabin of a vehicle. Further, a need exists for a system and method that allows for adaptive customization of portions of sidewalls within an internal cabin of an aircraft.

With those needs in mind, certain embodiments of the present disclosure provide an illuminating sidewall system for an internal cabin of a vehicle. The illuminating sidewall system includes a sidewall panel including at least one window, and a lighting assembly mounted in relation to the sidewall panel above the window(s). The lighting assembly is configured to emit light onto the sidewall panel over the window(s).

The illuminating sidewall system may include a light-directing shield. At least a portion of the lighting assembly is disposed behind the light-directing shield. The light-directing shield is configured to direct the light emitted by the lighting assembly. The light-directing shield defines at least one aperture through which the emitted light passes. In at least one embodiment, the light-directing shield may define a lower aperture and an upper aperture.

The illuminating sidewall system may include at least one light-transmissive indicia. The lighting assembly is configured to emit the light through the light-transmissive indicia. In at least one embodiment, the light-transmissive indicia includes wayfinding indicia.

The sidewall panel may include a scalloped edge that provides a vertically-oriented beveled surface that is configured to shape and direct emitted light downwardly and away from an outer edge.

The lighting assembly includes one or more light-emitting elements. The light-emitting element(s) may include one or more light-emitting diodes (LEDs).

A lighting control unit may be coupled to the lighting assembly. The lighting control unit may be configured to control operation of the lighting assembly.

In at least one embodiment, the lighting assembly is separate and distinct from a personal service unit.

Certain embodiments of the present disclosure provide an illuminating sidewall method for an internal cabin of a vehicle. The illuminating sidewall method includes providing a sidewall panel including at least one window, mounting a lighting assembly in relation to the sidewall panel above the window(s), and emitting light from the lighting assembly onto the sidewall panel over the window(s).

Certain embodiments of the present disclosure provide a vehicle including an internal cabin, and an illuminating sidewall system within the internal cabin.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide an illuminating sidewall system for an internal cabin of a vehicle, such as a commercial aircraft. The illuminating sidewall system includes a lighting assembly coupled to a sidewall panel. The lighting assembly is positioned over a window of the sidewall panel. In at least one embodiment, a light-directing shield directs light emitted from the lighting assembly downwardly towards the window and/or upwardly away from the window. The lighting assembly includes one or more light-emitting elements (such as light-emitting diodes) that may be controlled to provide a plurality of lighting effects. For example, the light-emitting elements may be operated to selectively change a color of emitted light. In at least one embodiment, the light-emitting elements are configured to emit light over a color range including red-orange-yellow-green-blue-indigo-violet, and mixtures of light therebetween. The lighting assembly may be operatively coupled to a lighting control unit that is configured to control the operation of the lighting assembly.

The lighting assembly may be operated to provide adaptable lighting features that are emitted onto the sidewall panel over the window. The lighting features may be selectively modified and changed, depending on desired lighting within the internal cabin.

The illuminating sidewall system is configured to provide a selective warm and intimate setting within the internal cabin of the vehicle. Further, the illuminating sidewall system allows a provider to customize lighting and effects thereof for branding purposes, for example. For example, an airline may select one or more colors that are associated with the airline. The illuminating sidewall system may be operated to illuminate such colors in relation to the sidewall panel.

In at least one embodiment, the light-directing shield may include light-transmissive indicia. For example, the light-transmissive indicia may include wayfinding characters such as seat numbers. Light emitted by the lighting assembly passes through the light-transmissive indicia, thereby illuminating the light-transmissive indicia. In at least one other embodiment, the light-transmissive indicia may include company names, slogans, or the like.

Embodiments of the present disclosure provide illuminating sidewall systems and methods that provide additional lighting options within an internal cabin, customizable lighting effects that allow for selectively adaptable lighting effects, and illuminated wayfinding features.

Figure 1:
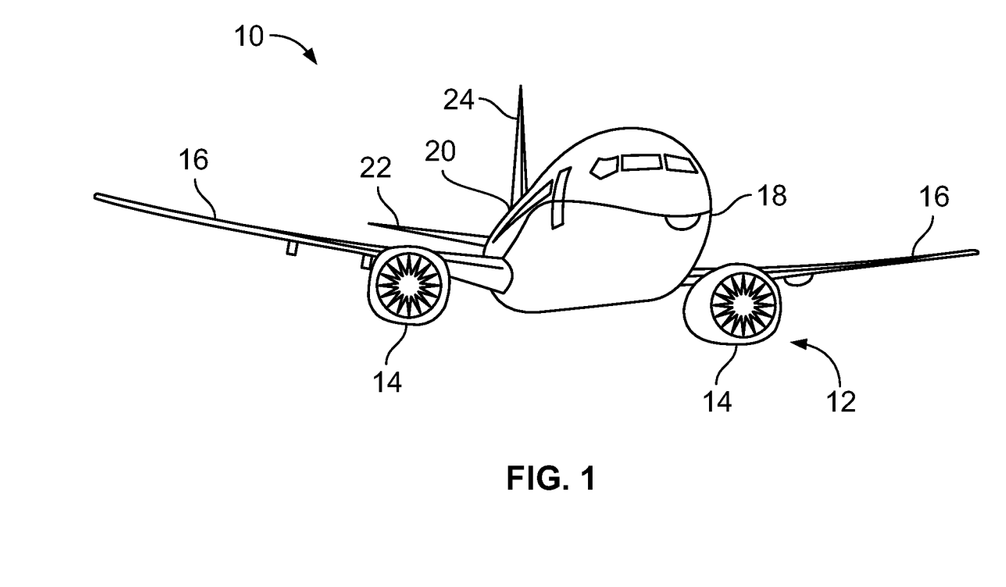
FIG. 1 illustrates a perspective front view of an aircraft, according to an embodiment of the present disclosure.

FIG. 1 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
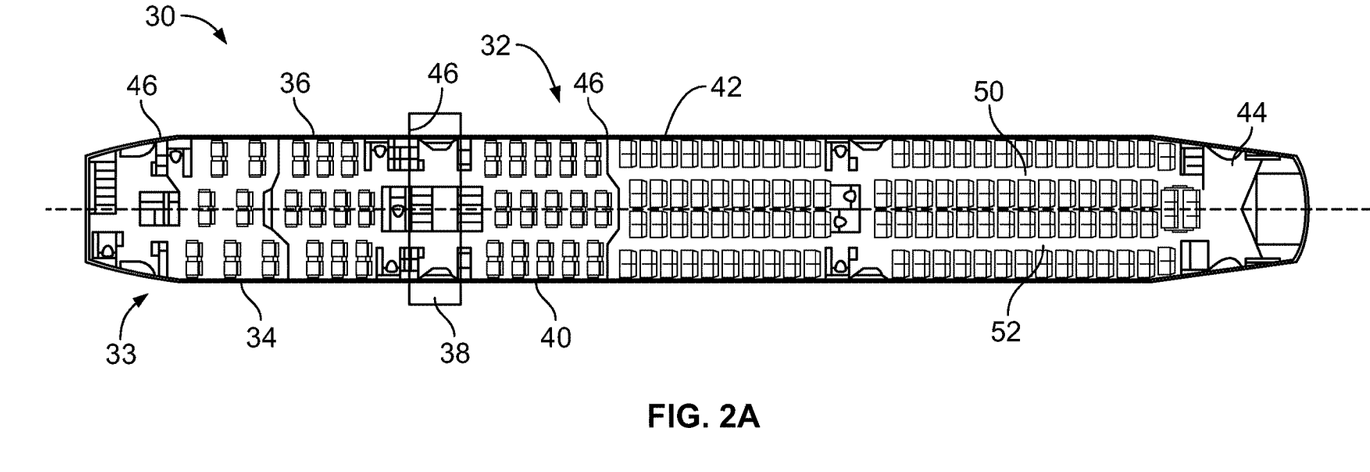
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
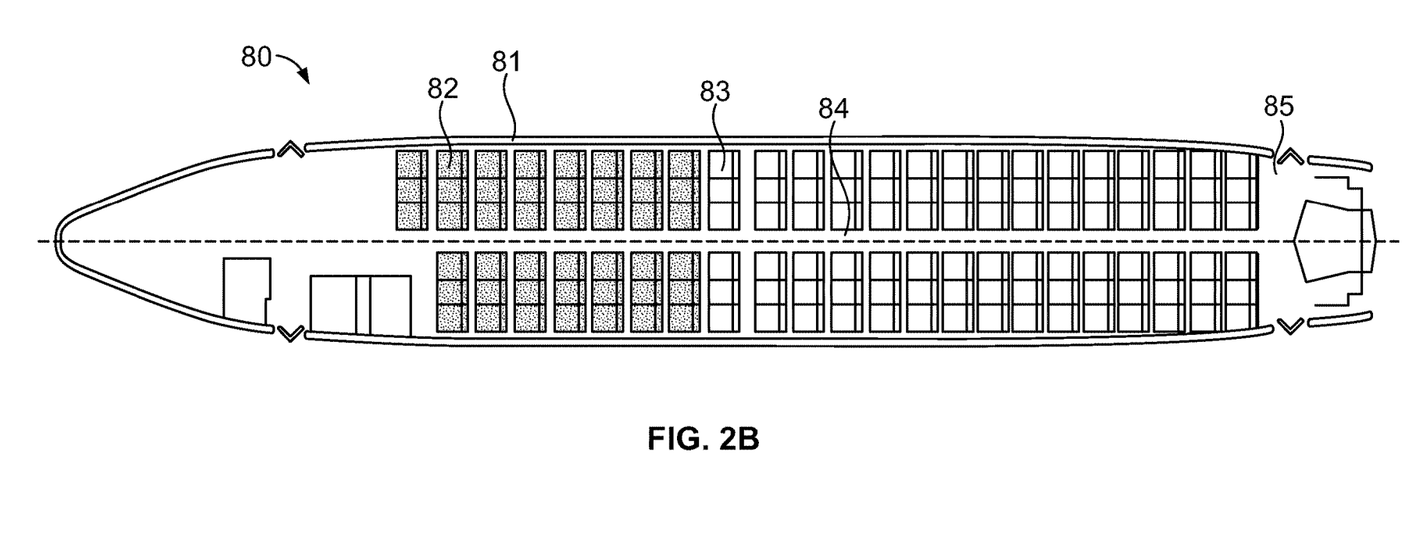
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
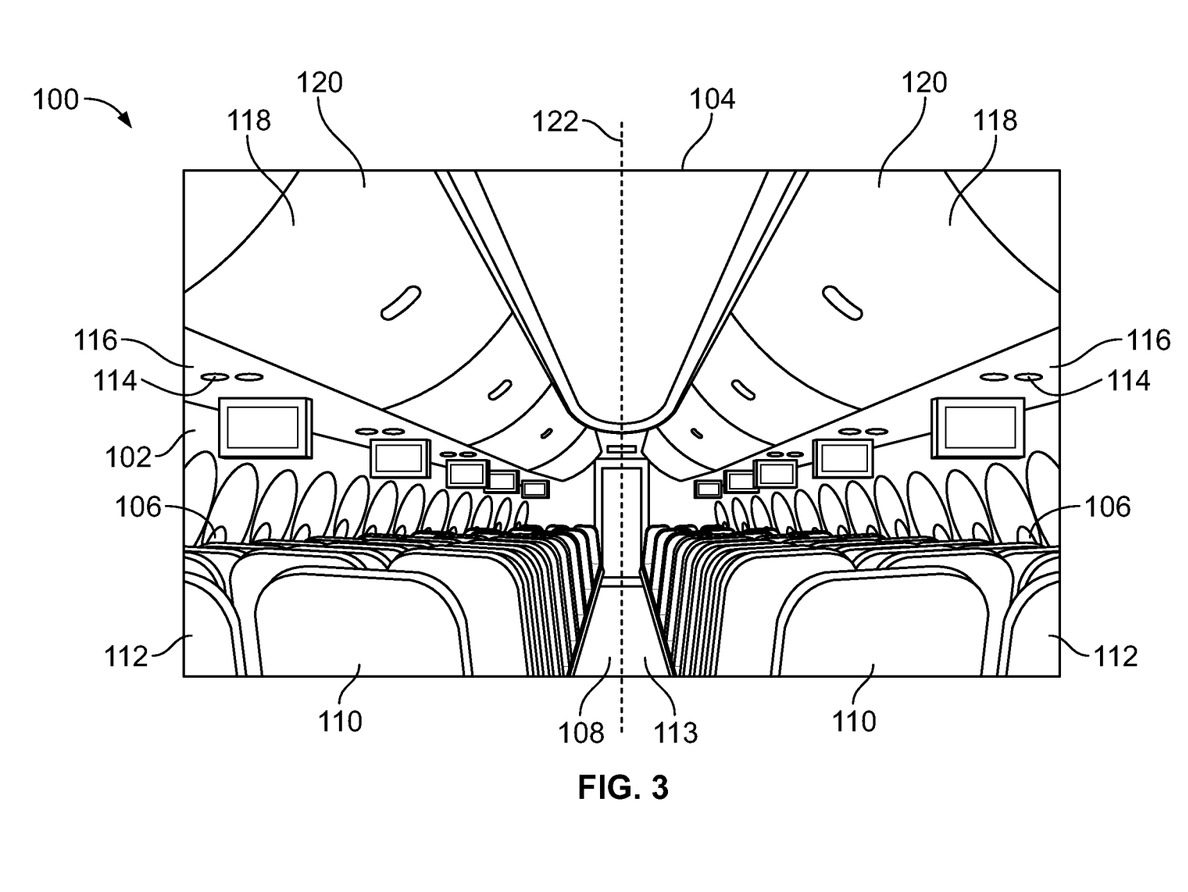
FIG. 3 illustrates a perspective interior view of an internal cabin of an aircraft, according to an embodiment of the present disclosure.

FIG. 3 illustrates a perspective interior view of an internal cabin 100 of an aircraft, according to an embodiment of the present disclosure. The internal cabin 100 includes outboard sidewalls 102 connected to a ceiling 104. Windows 106 may be formed within the outboard sidewalls 102. A floor 108 supports rows of seats 110. As shown in FIG. 3, a row 112 may include two seats 110 on either side of an aisle 113. However, the row 112 may include more or less seats 110 than shown. Additionally, the internal cabin 100 may include more aisles than shown.

Passenger service units (PSUs) 114 are secured between an outboard sidewall 102 and the ceiling 104 on either side of the aisle 113. The PSUs 114 extend between a front end and rear end of the internal cabin 100. For example, a PSU 114 may be positioned over each seat 110 within a row 112. Each PSU 114 may include a housing 116 that generally contains vents, reading lights, an oxygen bag drop panel, an attendant request button, and other such controls over each seat 110 (or groups of seats) within a row 112.

Overhead stowage bin assemblies 118 are secured to the ceiling 104 and/or the outboard wall 102 above and inboard from the PSU 114 on either side of the aisle 113. The overhead stowage bin assemblies 118 are secured over the seats 110. The overhead stowage bin assemblies 118 extend between the front and rear end of the internal cabin 100. Each stowage bin assembly 118 may include a pivot bin or bucket 120 pivotally secured to a strongback (hidden from view in FIG. 3). The overhead stowage bin assemblies 118 may be positioned above and inboard from lower surfaces of the PSUs 114. The overhead stowage bin assemblies 118 are configured to be pivoted open in order to receive passenger carry-on baggage and personal items, for example.

As used herein, the term "outboard" means a position that is further away from a central longitudinal plane 122 of the internal cabin 100 as compared to another component. The term "inboard" means a position that is closer to the central longitudinal plane 122 of the internal cabin 100 as compared to another component. For example, a lower surface of a PSU 114 may be outboard in relation to a stowage bin assembly 118.

Figure 4:
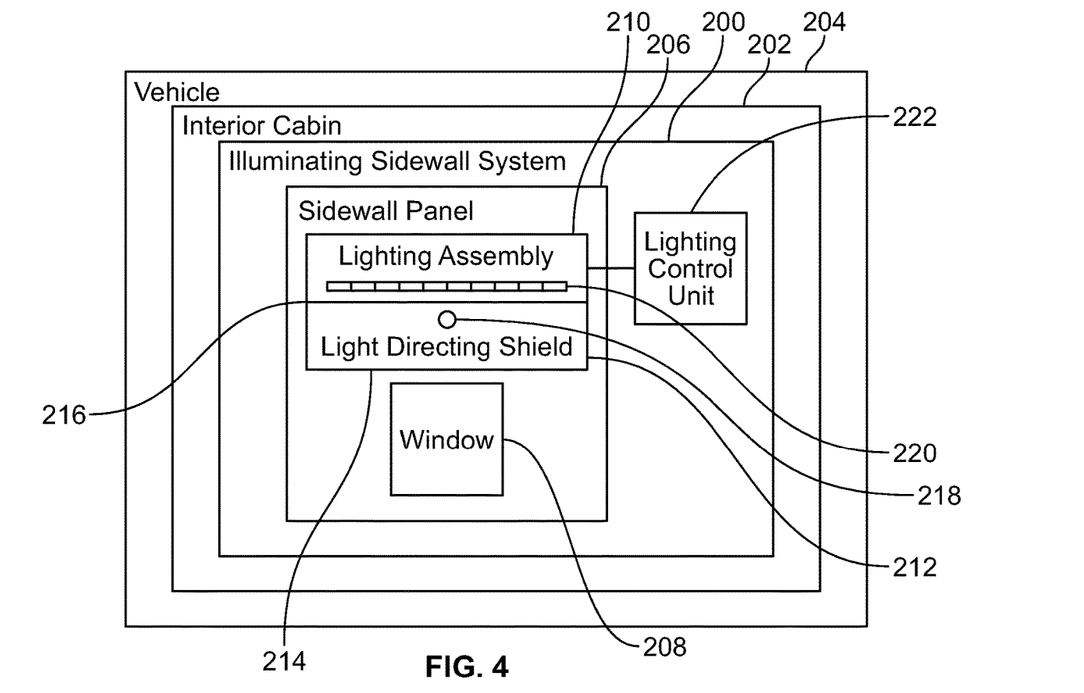
FIG. 4 illustrates a schematic block diagram of an illuminating sidewall system within an internal cabin of a vehicle, according to an embodiment of the present disclosure.

FIG. 4 illustrates a schematic block diagram of an illuminating sidewall system 200 within an internal cabin 202 of a vehicle 204, according to an embodiment of the present disclosure. The internal cabin 202 is an example of the internal cabin 100 shown in FIG. 3. The vehicle 204 may be a commercial aircraft, such as the aircraft 10 shown in FIG. 1.

The illuminating sidewall system 200 includes a sidewall panel 206. In at least one embodiment, the sidewall panel 206 forms at least part of an outboard sidewall of an internal cabin, such as the outboard sidewall 102 shown in FIG. 3. The sidewall panel 206 includes at least one window 208. The sidewall panel 206 may include one window 208, or multiple windows 208. In at least one embodiment, the sidewall panel 206 may form an entire outboard sidewall of the internal cabin 202.

The window 208 may be or include an opening. That is, the window 208 may or may not include a solid window panel and/or frame. In at least one embodiment, a fuselage of a vehicle is formed from frames, stringers, skins, and/or the like. A window belt area of a fuselage is a reinforced area that is configured to retain a transparent window panel(s), for example. Insulation blankets are secured over portions of the panels, and the sidewall panel(s) 206 are secured over the insulation blankets and internal portions of the fuselage. As such, the sidewall panel 206 may be a decorative structure including the window 208 (which may be an opening that overlies a window belt area of a fuselage) that secures to an underlying structure, such as portions of the fuselage and/or insulation blankets.

A lighting assembly 210 is mounted in relation to the sidewall panel 206 (such as mounted onto a rear surface of the sidewall panel 206, and/or to a ceiling or portion of the fuselage proximate to the rear surface of the sidewall panel 206) above the window 208. The sidewall panel 206 includes a light-directing shield 212. Optionally, the light-directing shield may be mounted to the sidewall panel 206. A lower aperture 214 is defined at a lower portion of the light-directing shield 212. An upper aperture 216 is defined at an upper portion of the light-directing shield 212. Optionally, only one of the apertures 214 or 216 may be used. For example, the light-directing shield 212 may include only a single aperture.

In at least one embodiment, the lighting assembly 210 is separate and distinct from a PSU, such as the PSUs 114 shown in FIG. 3. That is, the lighting assembly 210 is separate and distinct from light emitting devices of the PSUs. In at least one embodiment, the lighting assembly 210 is outboard from the PSU 114.

The lighting assembly 210 may be mounted behind the light-directing shield 212 and configured to emit light below and above the light-directing shield 212, such as through the lower aperture 214 and the upper aperture 216. In at least one embodiment, the light-directing shield 212 may include at least one light-transmissive indicia 218 that allow emitted light to pass therethrough. The lighting assembly 210 is configured to emit light through the light-transmissive indicia 218. Because the lighting assembly 210 may be positioned behind the light-transmissive indicia 218, the lighting assembly 210 may be configured to backlight the light-transmissive indicia 218. The light-transmissive indicia 218 may be or include one or more of a wayfinding indicia (such as a seat number), text, graphics, and/or the like, such as which may be used for company branding purposes.

The light-transmissive indicia 218 may be part of the light-directing shield 212, which may or may not be part of the sidewall panel 206. In at least one embodiment, the sidewall panel 206 (instead of a separate light-directing shield) may include the light-transmissive indicia 218.

The lighting assembly 210 includes one or more light-emitting elements 220, such as light-emitting diodes (LEDs) that are configured to be operated to emit light that may be selectively changed between different colors (such as red-orange-yellow-green-blue-indigo, violet, and mixes of colors therebetween). In at least one embodiment, a single light-emitting element 220 may be used. For example, a single tubular lighting element may be encased in a tubular transparent cover. In at least one other embodiment, multiple light-emitting elements may be used.

The lighting assembly 210 may be operatively coupled to a lighting control unit 222, such as through one or more wired or wireless connections. The lighting control unit 222 may be secured to the sidewall panel 206. Optionally, the lighting control unit 222 may be remotely located from the sidewall panel 206. For example, the lighting control unit 222 may be within another portion of the internal cabin 202, such as within a cockpit, galley station, or the like. The lighting control unit 222 may be in communication with a lighting assembly 210 of a plurality of sidewall panels 206 within the internal cabin 202. Alternatively, the lighting control unit 222 may be in communication with a lighting assembly 210 of only one sidewall panel 206. Examples of lighting assemblies are shown and described in U.S. Pat. No. 9,527,437, entitled "Lighting Assembly for Internal cabin of a Vehicle," which is hereby incorporated by reference in its entirety.

The lighting assembly 210 is disposed above the window 208, as shown in FIG. 4. The lighting assembly 210 may be a linear lighting assembly 210 positioned above one or more windows 208. Optionally, the lighting assembly 210 may be curved, circular, and/or the like.

In operation, the lighting control unit 222 controls operation of the lighting assembly 210. For example, an individual may select a color of light to be emitted by the light-emitting element(s) 220, and activate the light-emitting element(s) 220 via an interface coupled to the lighting control unit 222. Light emitted by the lighting assembly 210 is directed downwardly towards and over the window 208 through the lower aperture 214 of the light-directing shield 212. The emitted light may also be directed upwardly towards a ceiling through the upper aperture 216. Further, the emitted light from the lighting assembly 210 may be emitted through the light-transmissive indicia 218.

Accordingly, the lighting assembly 210 is used to provide light having desired properties (for example, desired color(s) and effect(s)) over and/or around the window 208. The properties (for example, color, intensity, luminosity, radiance, flickering, timed staggering of light-emitting elements 220 to provide motion effects, and/or the like) of the light may be customized and controlled through the lighting control unit 222.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the lighting control unit 222 may be or include one or more processors that are configured to control operation of the lighting assembly 210, as described herein.

The lighting control unit 222 is configured to execute a set of instructions that are stored in one or more data storage units or elements (such as one or more memories), in order to process data. For example, the lighting control unit 222 may include or be coupled to one or more memories. The data storage units may also store data or other information as desired or needed. The data storage units may be in the form of an information source or a physical memory element within a processing machine.

The set of instructions may include various commands that instruct the lighting control unit 222 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the lighting control unit 222. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the lighting control unit 222 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 5:
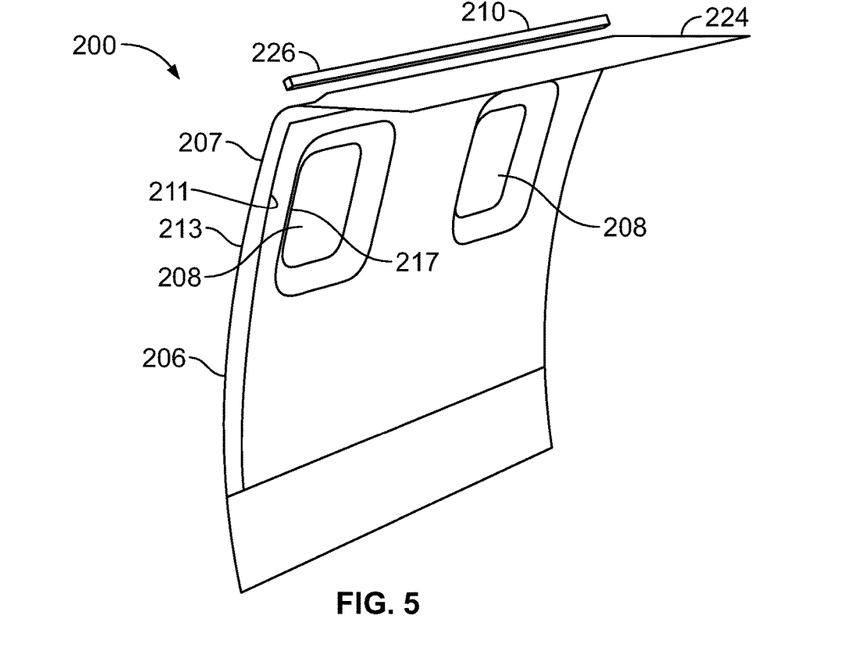
FIG. 5 illustrates a perspective interior view of an illuminating sidewall system, according to an embodiment of the present disclosure.
Figure 6:
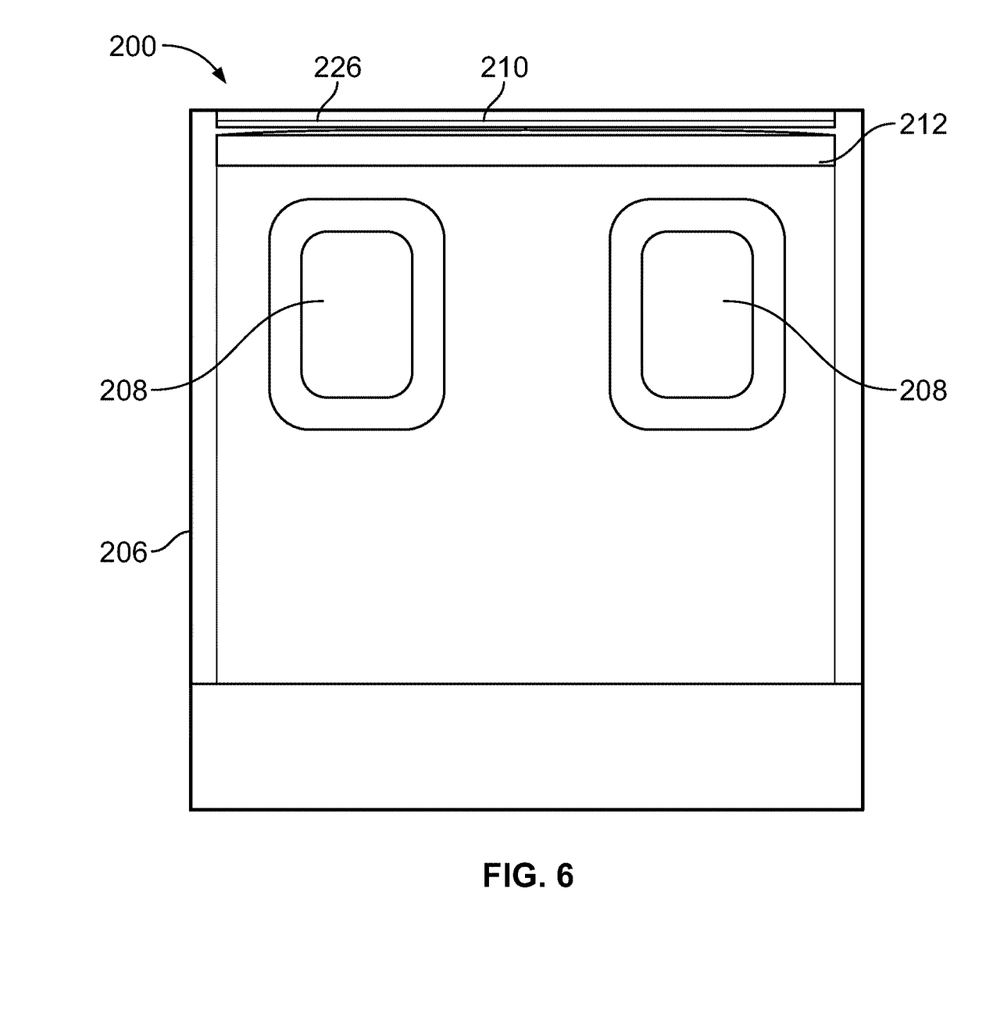
FIG. 6 illustrates a front view of an illuminating sidewall system, according to an embodiment of the present disclosure.

FIG. 5 illustrates a perspective interior view of the illuminating sidewall system 200, according to an embodiment of the present disclosure. FIG. 6 illustrates a front view of the illuminating sidewall system 200. Referring to FIGS. 5 and 6, the sidewall panel 206 includes two windows 208. Optionally, the sidewall panel 206 may include more than two windows 208, or only one window 208. The sidewall panel 206 may be outwardly bowed, as shown in FIG. 5, in particular.

A vertically oriented sculpted or scalloped edge 211 may be formed on the sidewall panel 206, such as between an outer edge 213 and an interior edge 217 of a window 208. The scalloped edge 211 may forma vertically-oriented beveled surface that is configured to shape and direct emitted light downwardly (thereby providing a rectangular look) and away from the outer edge 213, in contrast to allowing light to spill laterally towards the outer edge 213. In this manner, the scalloped edge 211 is configured to reduce light wash across a seam between adjacent sidewall panels 206. As such, the joint or seam between the adjacent sidewall panels 206 is shaded, thereby aesthetically minimizing or reducing the joint or seam.

The sidewall panel 206 connects to a portion of a ledge 224 at an upper end, and a portion of a wall and/or floor (not shown in FIG. 5) at a lower end. Optionally, the portion of the ledge 224 may be part of the sidewall panel 206. That is, the sidewall panel 206 may include the portion of the ledge 224.

The lighting assembly 210 may be securely mounted to and behind the sidewall panel 206. For example, the lighting assembly 210 may be securely mounted behind a rear surface 207 of the sidewall panel 206. The lighting assembly 210 may be securely mounted to the sidewall panel 206, a ceiling, and/or a portion of a fuselage defining an internal cabin through one or more fasteners, brackets, fixtures, adhesives, and/or the like. The lighting assembly 210 may include a linear housing 226 that includes one or more light-emitting elements 220, such as LEDs, incandescent bulbs or tubes, fluorescent bulbs or tubes, and/or the like.

Figure 7:
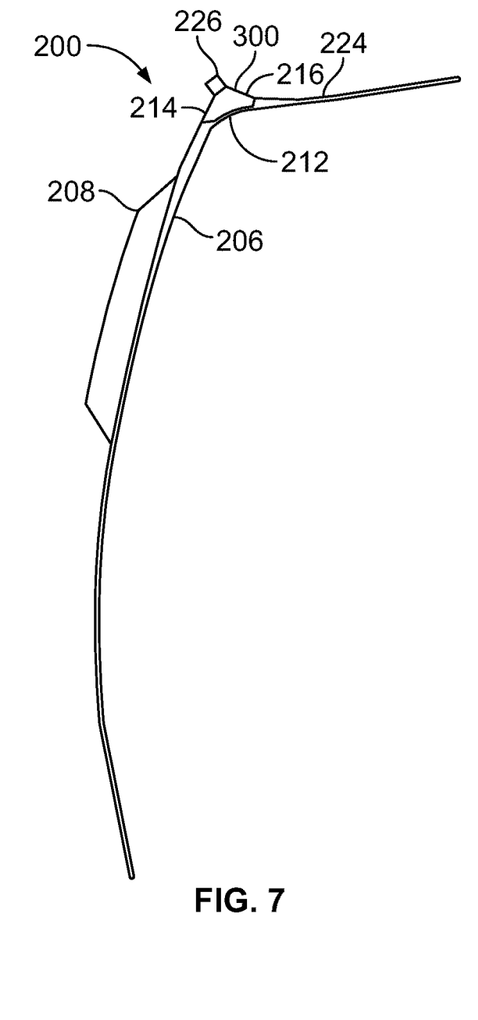
FIG. 7 illustrates an end view of an illuminating sidewall system, according to an embodiment of the present disclosure.

FIG. 7 illustrates an end view of the illuminating sidewall system 200, according to an embodiment of the present disclosure. Referring to FIGS. 5-7, the lighting assembly 210 may be mounted to an upper edge of the sidewall 226, or a portion of the ledge 224. In at least one embodiment, the lighting assembly 210 may be embedded within a portion of the sidewall 226 and/or the portion of the ledge 224. In at least one other embodiment, the lighting assembly 210 may be secured to an adjacent panel, such as a portion of a ceiling.

In operation, the lighting assembly 210 emits light 300 that is directed on the sidewall panel 206 over (and/or around) the window 208. The aperture 215 is sized and shaped to direct the light 215 over and/or around the window 208. Further, the aperture 215 may be sized and shaped to direct the light 300 onto a lower surface of the portion of the ledge 224.

Figure 8:
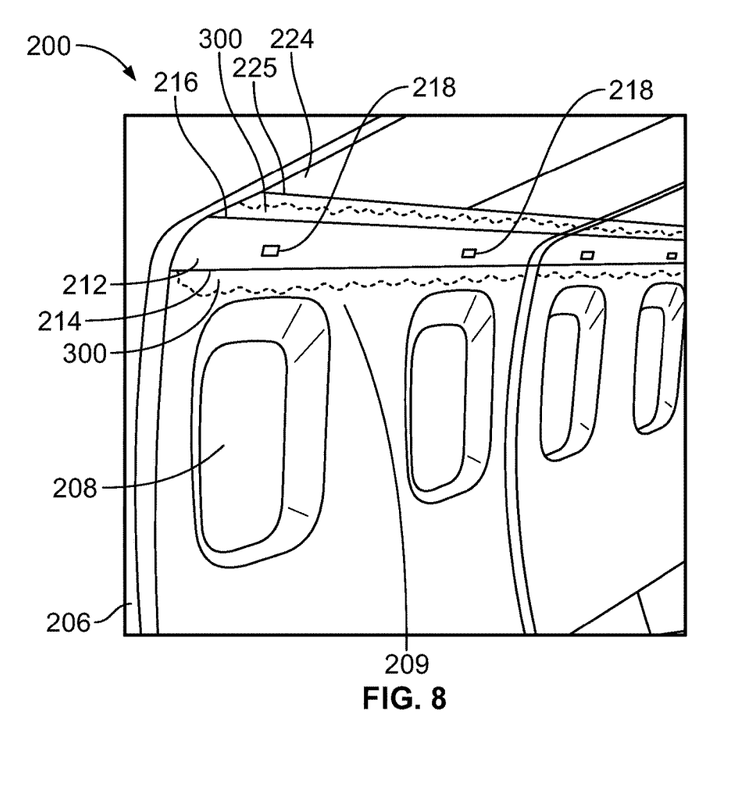
FIG. 8 illustrates a perspective interior view of an illuminating sidewall system, according to an embodiment of the present disclosure.

FIG. 8 illustrates a perspective interior view of the illuminating sidewall system 200, according to an embodiment of the present disclosure. The lighting assembly 210 (shown in FIGS. 4-7) is mounted to the sidewall panel 206 behind the light-directing shield 212. The light 300 emitted by the lighting assembly 210 is directed onto an interior surface 209 of the sidewall panel 206 above the windows 208 through the lower aperture 214. Further, the light 300 emitted by the lighting assembly 210 is directed onto an interior surface 225 of the portion of the ledge 224 through the upper aperture 216.

Further, the light 300 emitted by the lighting assembly 210 backlights the light-transmissive indicia 218 of the light-directing shield 212. As shown in FIG. 8, the light-transmissive indicia 218 may be wayfinding indicia, such as seat numbers. In at least one other embodiment, the light-transmissive indicia 218 may be or include a logo, text, graphics, and/or the like. Optionally, the light-directing shield 212 may not include the light-transmissive indicia.

Figure 9:
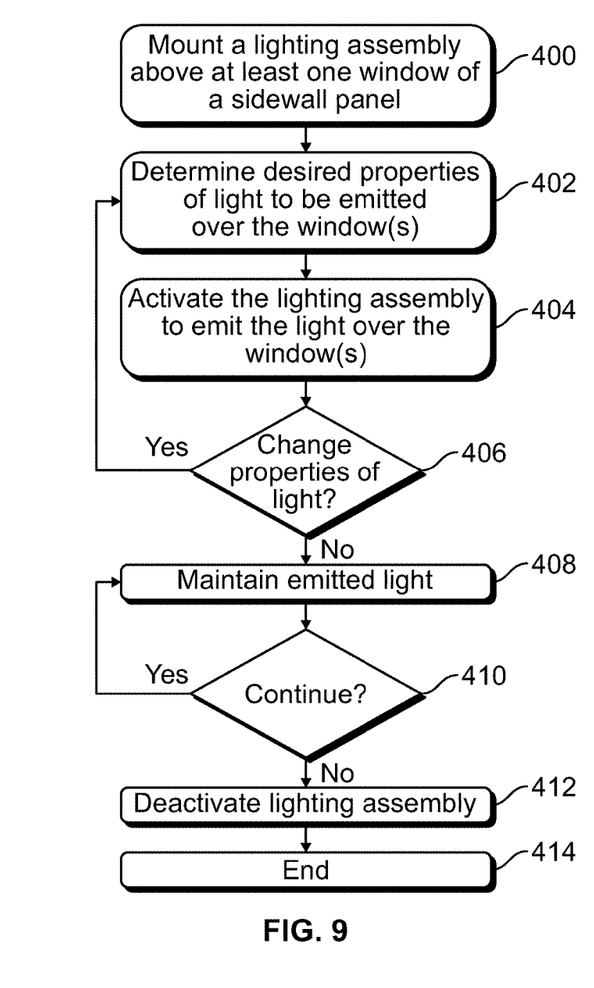
FIG. 9 illustrates a flow chart of a method of operating an illuminating sidewall system, according to an embodiment of the present disclosure.

FIG. 9 illustrates a flow chart of a method of operating an illuminating sidewall system, according to an embodiment of the present disclosure. Referring to FIGS. 4-9, the method begins at 400, at which the lighting assembly 210 is mounted above at least one window 208 of the sidewall panel 206. At 402, an individual determines desired properties (such as color, intensity, luminosity, radiance, motion effects, and/or the like) of light to be emitted over and/or around the windows(s) 208. At 404, the light assembly 210 is activated (such as via a user interface coupled to the lighting control unit 222) to emit the light over the window(s) 208.

At 406, an individual decides whether or not to change the properties of the emitted light. If the individual does decide to change one or more properties of the light, the method returns to 402.

If, however, the individual does not wish to change the properties of the light, the method proceeds from 406 to 408, at which the emitted light is maintained. Then, at 410, the individual determines whether or not to continue the lighting effects. If the lighting effects are to continue, the method returns to 408. If, however, the lighting effects are to cease, the method proceeds from 410 to 412, at which the lighting assembly 210 is deactivated (such as through the user interface coupled to the lighting control unit 222), and then the method ends at 414.

As described herein, embodiments of the present disclosure provide systems and methods of adaptively modifying sidewalls within an internal cabin of a vehicle, such as through one or more lighting effects. Further, embodiments of the present disclosure provide systems and methods that allow for adaptive customization of portions of sidewalls within an internal cabin of an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An illuminating sidewall system for an internal cabin of a vehicle, the illuminating sidewall system comprising:
   a sidewall panel including at least one window, wherein the sidewall panel comprises a scalloped edge that provides a vertically-oriented beveled surface; and
   a lighting assembly mounted behind the sidewall panel above the at least one window, wherein the lighting assembly is configured to emit light onto the sidewall panel over the at least one window, wherein the vertically-oriented beveled surface is configured to shape and direct emitted light downwardly and away from an outer edge.

2. The illuminating sidewall system of claim 1, further comprising a light-directing shield, wherein at least a portion of the lighting assembly is disposed behind the light-directing shield, and wherein the light-directing shield is configured to direct the light emitted by the lighting assembly.

3. The illuminating sidewall system of claim 2, wherein the light-directing shield defines at least one aperture through which the emitted light passes.

4. The illuminating sidewall system of claim 3, wherein the at least one aperture comprises a lower aperture and an upper aperture.

5. The illuminating sidewall system of claim 1, further comprising at least one light-transmissive indicia, wherein the lighting assembly is configured to emit the light through the light-transmissive indicia.

6. The illuminating sidewall system of claim 5, wherein the light-transmissive indicia comprises wayfinding indicia.

7. The illuminating sidewall system of claim 1, wherein the lighting assembly comprises one or more light-emitting elements.

8. The illuminating sidewall system of claim 1, further comprising a lighting control unit that is coupled to the lighting assembly, wherein the lighting control unit is configured to control operation of the lighting assembly.

9. The illuminating sidewall system of claim 1, wherein the lighting assembly is separate and distinct from a personal service unit.

10. An illuminating sidewall method for an internal cabin of a vehicle, the illuminating sidewall method comprising:
providing a sidewall panel including at least one window;
providing a lighting assembly with one or more light-emitting elements including one or more light-emitting diodes (LEDs);
mounting the lighting assembly behind the sidewall panel above the at least one window; and
emitting light from the lighting assembly onto the sidewall panel over the at least one window.

11. The illuminating sidewall method of claim 10, further comprising:
providing a light-directing shield;
disposing at least a portion of the lighting assembly behind the light-directing shield; and
directing the light emitted by the lighting assembly by the light-directing shield.

12. The illuminating sidewall method of claim 11, wherein the providing the light-directing shield comprises defining at least one aperture through which the emitted light passes.

13. The illuminating sidewall method of claim 12, wherein the defining comprises defining a lower aperture and an upper aperture.

14. The illuminating sidewall method of claim 10, further comprising:
providing at least one light-transmissive indicia; and
wherein the emitting comprises emitting the light through the light-transmissive indicia.

15. The illuminating sidewall method of claim 14, wherein the light-transmissive indicia comprises wayfinding indicia.

16. The illuminating sidewall method of claim 10, further comprising:
coupling a lighting control unit to the lighting assembly; and
controlling the lighting assembly with the lighting control unit.

17. The illuminating sidewall method of claim 10, wherein the lighting assembly is separate and distinct from a personal service unit.

18. A vehicle comprising:
an internal cabin; and
an illuminating sidewall system within the internal cabin, the illuminating sidewall system comprising:
a sidewall panel including at least one window;
a lighting assembly mounted behind the sidewall panel above the at least one window, wherein the lighting assembly comprises one or more light-emitting elements including one or more light-emitting diodes (LEDs), wherein the lighting assembly is configured to emit light onto the sidewall panel over the at least one window;
a light-directing shield, wherein at least a portion of the lighting assembly is disposed behind the light-directing shield, and wherein the light-directing shield is configured to direct the light emitted by the lighting assembly, wherein the light-directing shield defines at least one aperture through which the emitted light passes;
at least one light-transmissive indicia, wherein the lighting assembly is configured to emit the light through the light-transmissive indicia; and
a lighting control unit that is coupled to the lighting assembly, wherein the lighting control unit is configured to control operation of the lighting assembly, wherein the lighting assembly is separate and distinct from a personal service unit.

19. An illuminating sidewall system for an internal cabin of a vehicle, the illuminating sidewall system comprising:
a sidewall panel including at least one window;
a lighting assembly mounted behind the sidewall panel above the at least one window, wherein the lighting assembly is configured to emit light onto the sidewall panel over the at least one window; and
a lighting control unit that is coupled to the lighting assembly, wherein the lighting control unit is configured to control operation of the lighting assembly.

20. The illuminating sidewall system of claim 19, further comprising a light-directing shield, wherein at least a portion of the lighting assembly is disposed behind the light-directing shield, and wherein the light-directing shield is configured to direct the light emitted by the lighting assembly.

21. The illuminating sidewall system of claim 20, wherein the light-directing shield defines at least one aperture through which the emitted light passes.

22. The illuminating sidewall system of claim 21, wherein the at least one aperture comprises a lower aperture and an upper aperture.

23. The illuminating sidewall system of claim 19, further comprising at least one light-transmissive indicia, wherein the lighting assembly is configured to emit the light through the light-transmissive indicia.

24. The illuminating sidewall system of claim 23, wherein the light-transmissive indicia comprises wayfinding indicia.

25. The illuminating sidewall system of claim 19, wherein the lighting assembly comprises one or more light-emitting elements.

26. The illuminating sidewall system of claim 19, wherein the lighting assembly is separate and distinct from a personal service unit.

27. An illuminating sidewall method for an internal cabin of a vehicle, the illuminating sidewall method comprising:
providing a sidewall panel including at least one window;
mounting a lighting assembly behind the sidewall panel above the at least one window;
coupling a lighting control unit to the lighting assembly;
controlling the lighting assembly with the lighting control unit; and
emitting light from the lighting assembly onto the sidewall panel over the at least one window.

28. The illuminating sidewall method of claim 27, further comprising:
providing a light-directing shield;

disposing at least a portion of the lighting assembly behind the light-directing shield; and directing the light emitted by the lighting assembly by the light-directing shield.

29. The illuminating sidewall method of claim 28, wherein the providing the light-directing shield comprises defining at least one aperture through which the emitted light passes.

30. The illuminating sidewall method of claim 29, wherein the defining comprises defining a lower aperture and an upper aperture.

31. The illuminating sidewall method of claim 27, further comprising:

providing at least one light-transmissive indicia; and wherein the emitting comprises emitting the light through the light-transmissive indicia.

32. The illuminating sidewall method of claim 31, wherein the light-transmissive indicia comprises wayfinding indicia.

33. The illuminating sidewall method of claim 27, wherein the lighting assembly is separate and distinct from a personal service unit.

\* \* \* \* \*

UNITED STATES PATENT AND TRADEMARK OFFICE
CERTIFICATE OF CORRECTION

PATENT NO. : 10,494,078 B2  
APPLICATION NO. : 15/895020  
DATED : December 3, 2019  
INVENTOR(S) : Sunghoon Lee and Weston Van Wambeke Page 1 of 1

It is certified that error appears in the above-identified patent and that said Letters Patent is hereby corrected as shown below:

On the Title Page

In item (72) Inventor: Inventor Sunghoon Lee's first name is: Ethan

Signed and Sealed this
Twenty-fourth Day of November, 2020

Andrei Iancu
*Director of the United States Patent and Trademark Office*